United States Patent [19]

Walton et al.

[11] Patent Number: 5,023,540
[45] Date of Patent: Jun. 11, 1991

[54] BRUSHLESS POWER GENERATING SYSTEM HAVING REDUCED CONDUCTED EMISSIONS IN OUTPUT POWER

[75] Inventors: Derrick N. Walton, Roscoe; Clarence F. Dolan; Mahesh J. Shah, both of Rockford, all of Ill.

[73] Assignee: Sundstrand Corporation, Rockford, Ill.

[21] Appl. No.: 454,968

[22] Filed: Dec. 22, 1989

[51] Int. Cl.$^5$ .................................. H02K 11/00
[52] U.S. Cl. ................................. 322/58; 363/39
[58] Field of Search ........................... 322/58; 363/39

[56] References Cited

U.S. PATENT DOCUMENTS

| | | | |
|---|---|---|---|
| 3,866,110 | 2/1975 | Ruggeri | 322/58 X |
| 4,683,529 | 7/1987 | Bucher, II | 363/44 |
| 4,695,939 | 9/1987 | Canay | 322/58 X |
| 4,862,341 | 8/1989 | Cook | 322/58 X |

FOREIGN PATENT DOCUMENTS 53-23246  3/1978  Japan .

Primary Examiner—R. J. Hickey
Attorney, Agent, or Firm—Antonelli, Terry, Stout & Kraus

[57] ABSTRACT

A brushless electrical power generating system (100) in accordance with the invention includes an exciter (14) for producing alternating current from an exciter rotor; a rectifier (20) mounted for rotation with the exciter rotor for producing a rectified control current from the AC current; a common mode inductor (112), coupled to the control current, for cancelling common mode noise components within the rectified control current; and a main generator (22), having a rotating field winding (24) mounted on a main generator rotor excited by the control current and producing an alternating current power output from a stator.

17 Claims, 3 Drawing Sheets

BRUSHLESS POWER GENERATING SYSTEM HAVING REDUCED CONDUCTED EMISSIONS IN OUTPUT POWER

TECHNICAL FIELD

The present invention relates to brushless power generating systems producing electrical power with reduced noise.

BACKGROUND ART

FIG. 1 illustrates a prior art brushless three phase alternating current power generating system 10 of the type manufactured by the Assignee of the present invention for applications in airframes. The basic power generating system 10 uses a permanent magnetic generator (PMG) 12 to produce electrical power for exciting a field winding 16 of an exciter 14. Three phase alternating current is produced by the exciter 14 from a three phase winding 18 which is wound on a rotor which is part of a rotating assembly 19 mounted on a single shaft. The rotating assembly 19 also contains a full wave rectifier 20 and a field winding 24, which is wound on a rotor 22 of a main generator, and optionally a permanent magnet rotor of the PMG 12. However, the permanent magnet rotor may be mounted on a second shaft driven with the rotors of the exciter 14 and main generator 22. The output of the three phase winding 18 is rectified by the three phase full wave rectifier 20 which drives the field winding 24 of the main generator 22. Three phase output current is produced by the three phase output winding 26 which is connected to a neutral N. A voltage regulator 28 is coupled to a point of reference 30 of the AC output of the main generator 22, to the exciter field winding 16 magnetically linked to the three phase winding 18 and to the PMG 12. The voltage regulator 28 pulse width modulates a current flowing through the field winding 16 as a function an error signal which is proportional to a difference between a voltage at the point of reference 30 and a reference voltage which is proportional to a desired voltage at the point of reference. The pulse width modulation of the current flowing in the field winding 16 is conventional. The aforementioned brushless power generating system 10 is conventional in airframes. The power for driving the rotor of the permanent magnetic generator 12, rotor of the exciter 14 on which is wound the three phase winding 18 and the rotor of the main generator on which is wound the field winding 24 is produced by a constant speed drive transmission coupled to an airframe propulsion engine.

A resistor 32 is coupled in parallel with the field winding 24 for the purpose of attenuating high frequency differential mode noise which is outputted by the three phase full wave rectifier 20 and is identified in FIG. 1 by $I_D$. As a consequence of the inductance of the field winding 24, high frequency differential mode noise is shunted by the resistor 32 to avoid magnetically coupling the differential mode noise from the field winding 24 to the three phase output winding 26.

The use of a common mode inductor to attenuate common mode noise flowing to an electrical load is known. A common mode inductor has a pair of windings magnetically coupled to a magnetic core in phase opposition to each other in series with an electrical load. The common mode inductance is for the purpose of attenuating a small magnitude common mode noise flowing in both of the leads leading to the electrical load in the presence of a larger differential mode noise. An example of a common mode inductor is disclosed in U.S. Pat. No. 4,683,529.

Airframe manufacturers have specifications limiting the level of noise current as a function of frequency which may be present in electrical power used by the airframe. The limit 106 of FIG. 3 is representative of the noise current as a function of frequency which may be present on an airframe power bus. The limit 106 has a constant magnitude for frequencies above a frequency at the point of inflection 108. The hatched area of the current $I_C$ represents a portion of the output current from a main generator which exceeds the limit 106 which may be produced by prior art 400 Hz electrical power generating systems for airframes prior to filtering. The hatched portion of the output current above the limit 106 is a frequency range of approximately between 100 kHz to 5 MHz. Conventional filtering of the output current from the main generator is disadvantageous in that the inductors and capacitors of the filter must be sized to handle the high power output with the attendant weight, size and cost penalty.

DISCLOSURE OF INVENTION

The present invention is a brushless AC power generating system producing electrical power with reduced noise. The invention is predicated upon the discovery by the inventors that a substantial portion of electrical noise produced in the three phase output of the main generator 22 of the prior art electrical power generator illustrated in FIG. 1 is produced by common mode noise produced by the pulse width modulation of the field current of the field winding 16 by the voltage regulator 28 and rectification of the alternating current by the 3 phase full wave rectifier 20. The pulse width modulation of the field current of the exciter 14 produces common mode frequency components which are capacitively coupled to the three phase winding 18. The aforementioned noise components cause a common mode current $I_C$ to flow in the outputs of the full wave rectifier 20 which is capacitively coupled from the field winding 24 to the three phase stator winding 26 of the main generator 22 which results in an undesirably high level of electrical noise present in the three phase outputs exceeding the aforementioned specification in the frequency range of 100 kHz to 5 MHz. The invention cancels the common mode noise current by utilization of a common mode inductor in series with the field winding 24 of the main generator 22. Cancellation of a common mode noise by the common mode inductor prevents the capacitive coupling from the field windings 16 and 24 to the three phase output winding 26 which may reduce the noise level in the three phase output to a level which complies with the aforementioned airframe manufacturers specification for limiting electrical noise in three phase 400 Hz electrical power.

A brushless electrical power generating system in accordance with the invention includes an exciter for producing alternating current from an exciter rotor; a rectifier mounted for rotation with the exciter rotor for producing a rectified control current from the alternating current; a common mode inductor, coupled to the rectifier, for cancelling common mode noise components within the rectified control current; and a main generator, coupled to the common mode inductor, having a rotating field winding mounted on a main generator rotor excited by the control current and producing an alternating current electrical power output from a stator. The invention further includes a point of regulation; a voltage regulator, coupled to the point of regulation in the alternating current electrical power output and to an exciter field winding magnetically linked to a winding in the rotor of the exciter, producing the alternating current the alternating current power output varying in response to an error signal proportional to a difference between a voltage at the point of reference and a reference voltage which is proportional to a desired voltage at the point of reference. The voltage regulator pulse width modulates the control current as a function of error signal. The common mode inductor has a pair of windings magnetically coupled together respectively producing magnetic fields in phase opposition and in series with field winding of the main generator. The invention further includes a permanent magnet generator having a permanent magnet rotor rotated when the rotors of the exciter and the main generator are rotated which produces current for exciting a field winding of the exciter.

In a brushless electrical power generating system having a voltage regulator which controls a control current in an exciter winding for regulating voltage of an alternating current electrical power output produced by a main generator, an improvement in accordance with the present invention includes a common mode inductor capacitively coupled to the exciter field winding and capacitively coupled to a field winding of the main generator; for cancelling a common mode noise from the control current produced by capacitive coupling of the exciter field winding to the field winding of the main AC generator. The invention further includes a main generator field winding coupled in series with a pair of windings of the common mode inductor magnetically linked together. The invention further includes a permanent magnet generator having a permanent magnet rotor rotated when rotors of an exciter and the main AC generator are rotated which produces current for exciting a field winding of the exciter.

BEST MODE FOR CARRYING OUT THE INVENTION

Figure 1:
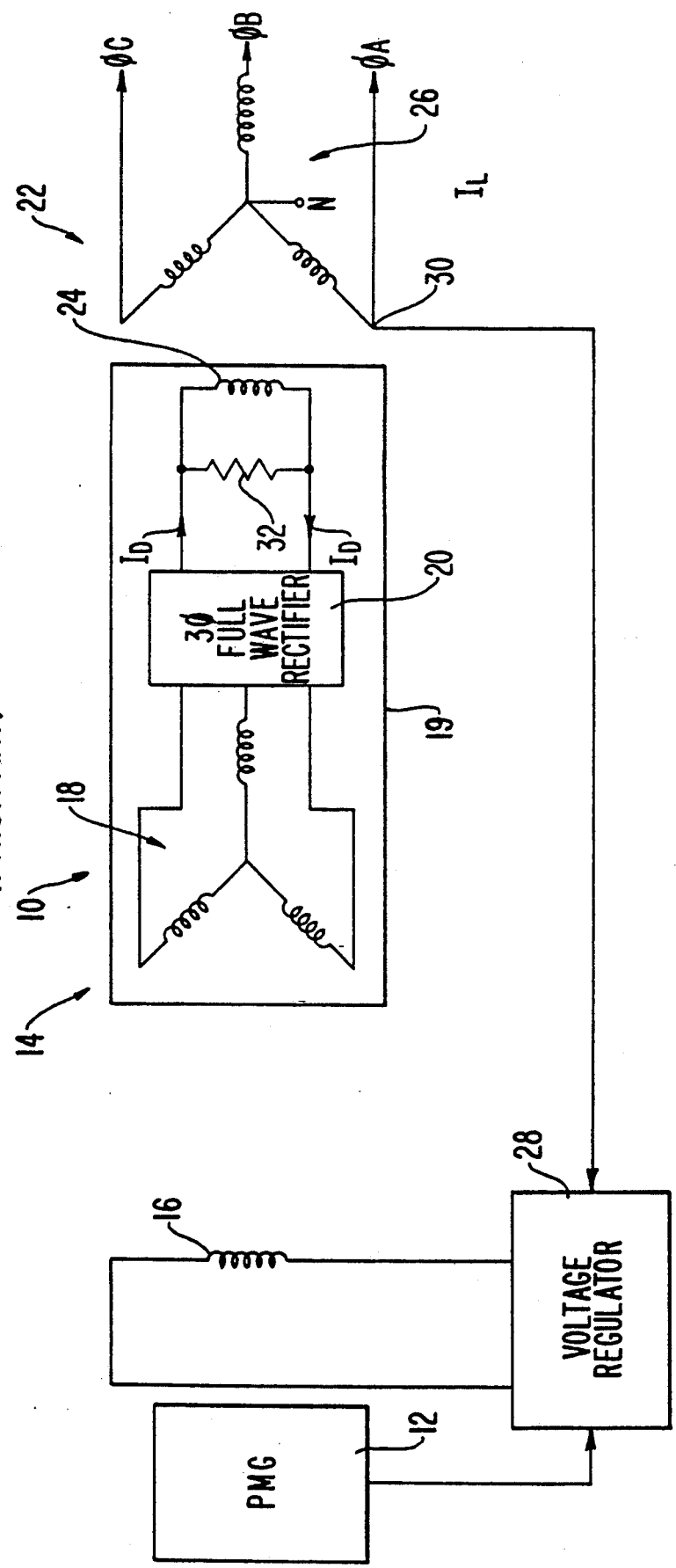
FIG. 1 illustrates a block diagram of a prior art brushless AC power generating system of the type manufactured by the Assignee of the present invention for airframe applications.
Figure 2:
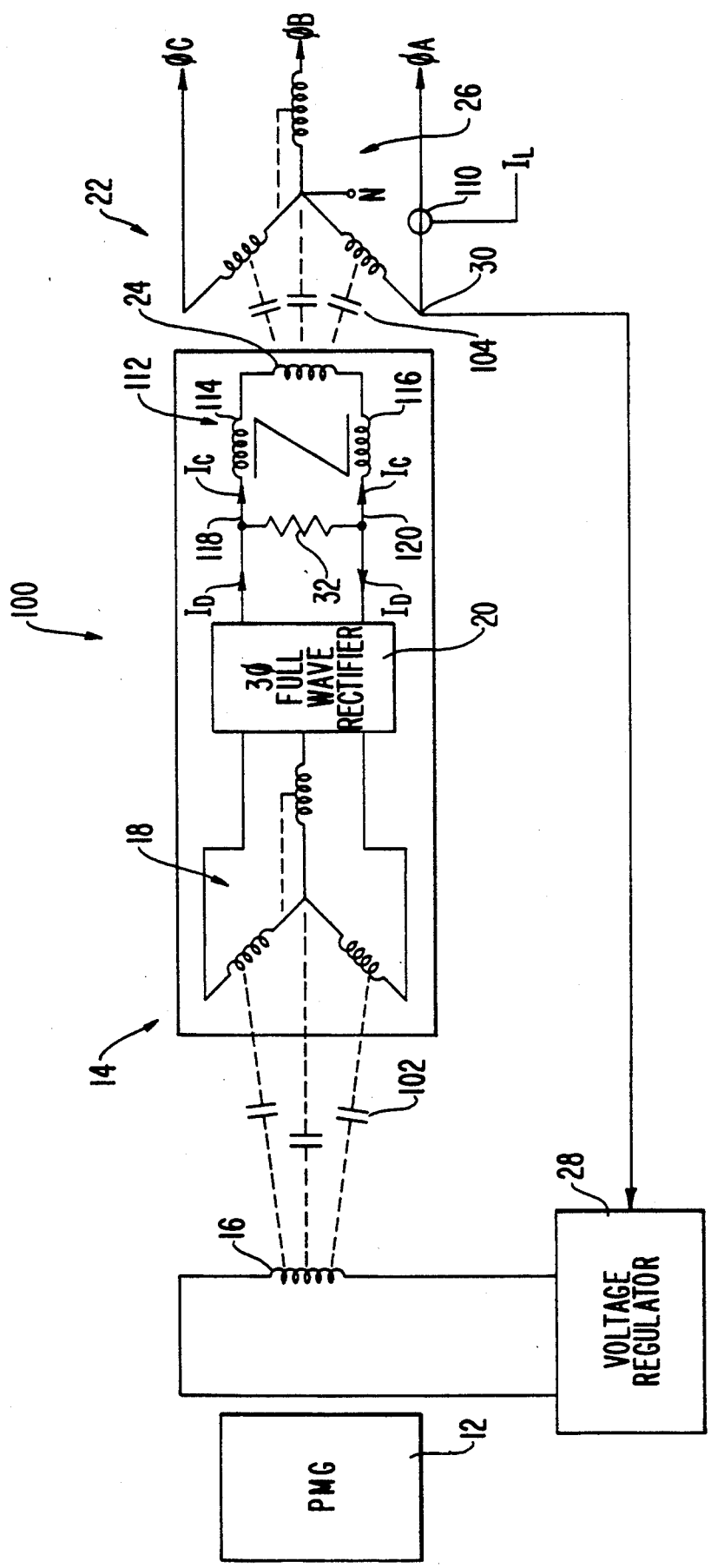
FIG. 2 illustrates a block diagram of an embodiment of the present invention.

FIG. 2 illustrates a block diagram of an electrical power generating system 100 in accordance with the present invention. Like reference numerals identify like parts in FIGS. 1 and 2. The present invention is predicated upon the discovery that a capacitive coupling 102 of noise between the exciter field winding 16 and the three phase winding 18 and a capacitive coupling 104 of noise between the field winding 24 of the main generator 22 is a source of appreciable noise in the three phase alternating current electrical power output produced by the main generator.

Figure 3:
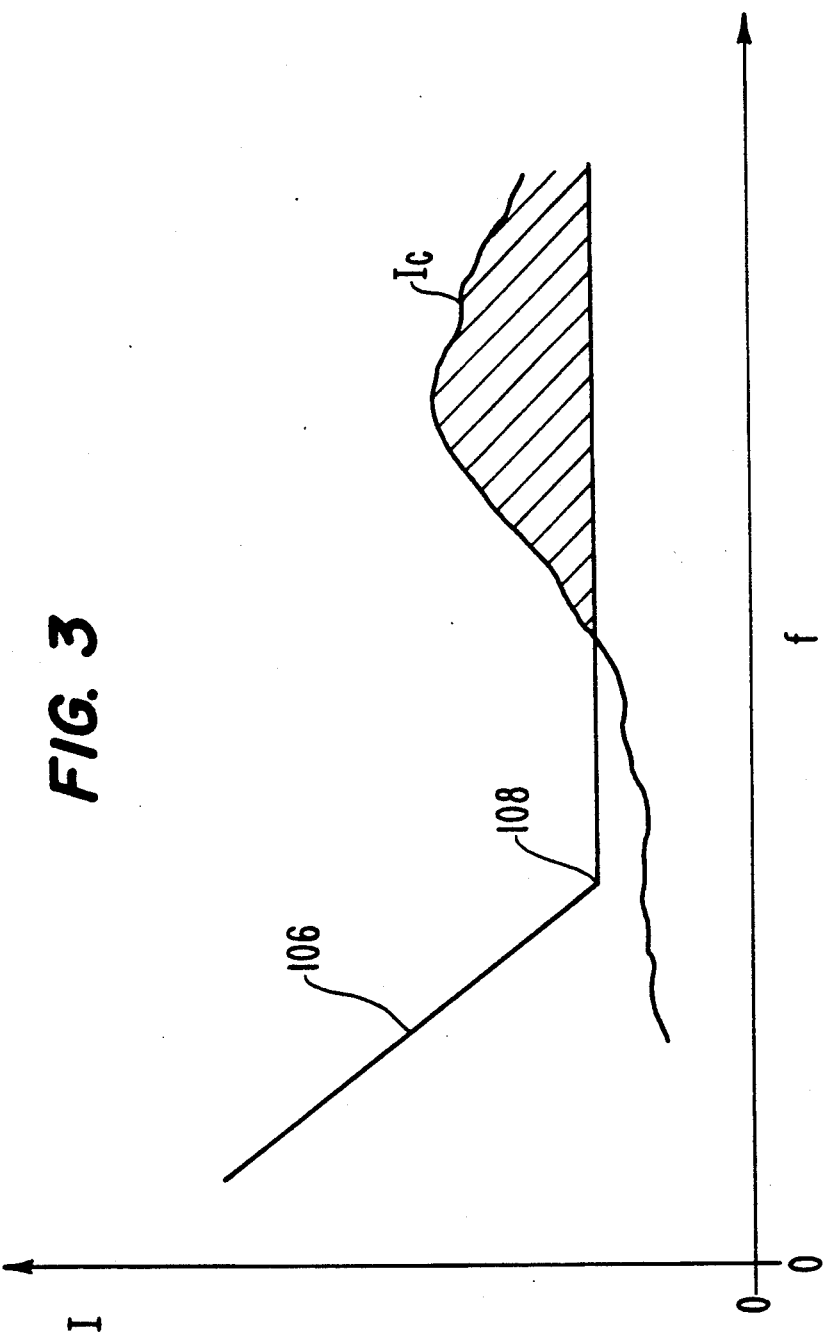
FIG. 3 illustrates a specification of output noise for an airframe power generating system.

FIG. 3 illustrates a graph of an airframe manufacturer's specification of output noise in the three phase alternating current output from the main generator 22 as a function of frequency. As is apparent from FIG. 3, the noise current limit 106 falls linearly as a function of frequency to a minimum point 108 which is above the fundamental output frequency of 400 hertz and is constant thereafter for increasing frequencies. The inventors have discovered that an appreciable quantity of common mode noise $I_C$ is produced by the voltage regulator 28 and diodes of the full wave rectifier 20. As illustrated in FIG. 3, the magnitude of the common mode current noise $I_C$ exceeds the current limit 106 for frequencies typically between 100 kHz and 5 MHz. The current limit specification is tested by applying a current sensor 110 to one of the phase outputs from the main generator 22 of FIG. 2.

Cancellation of the common mode current $I_C$ is produced by a common mode inductor 112 which is connected in series with the field winding 24 of the main generator and the outputs of the three phase full wave rectifier 20. The common mode inductor 112 has a first winding 114 which is wound in a first direction in phase opposition to a second winding 116 wound in a second direction. The windings 114 and 116 are magnetically linked such that common mode noise current flowing in leads 118 and 120, which would be capacitively coupled by capacitive coupling 104 to the three phase output winding 26 resulting in unacceptably high electrical noise as illustrated in the hatched portion above the current limit 106 in FIG. 3, is cancelled. As a result of the common mode inductance 112, the common mode current $I_C$ is substantially cancelled which may enable compliance to the aforementioned current limit specification 106 of FIG. 3.

The common mode inductance 112 has a substantial advantage over filtering of the output current from the three phase output winding 26 which is a conventional mechanism for eliminating undesired noise. As a consequence of the three phase output current from the output winding 26 being of a high level, it is necessary to utilize large filter capacitors and inductors to remove undesired frequency components of a relatively small power level from the output current. Large capacitors and inductors are a weight and spatial penalty for airframe applications and are expensive.

With the invention the common mode current is cancelled in a control portion of the electrical power generating system 100 instead of in the current output section such as would conventionally be the solution with the prior art. Because the level of current flow to the field winding 24 is small in comparison to the current level flowing in the three phase output winding 26, a much smaller common mode inductor may be utilized because of the much lower power level of the control circuitry for the field winding of the main generator 22. Additionally, a common mode three phase inductor cannot be utilized in applications for driving an unbalanced load as a consequence of the common mode inductance requiring that the sum of the currents to the neutral be zero. Unbalanced loads are encountered in airframe applications. Additionally, a three phase common mode inductor is expensive to fabricate.

While the invention has been described in terms of its preferred embodiment, it should be understood that numerous modifications may be made thereto without departing from the spirit and scope of the invention as defined in the appended claims. It is intended that all such modifications fall within the scope of the appended claims.

We claim:

1. A brushless electrical power generating system comprising:
   an exciter for producing alternating current from an exciter rotor;
   a rectifier mounted for rotation with the rotor for producing a rectified control current from the alternating current;
   a common mode inductor, coupled to the rectifier, for cancelling common mode noise components within the rectified control current; and
   a main generator, having a rotating field winding mounted on a main generator rotor excited by the control current and producing an alternating current power output from a stator.

2. A brushless electrical power generating system in accordance with claim 1 further comprising:
   a point of regulation;
   a voltage regulator, coupled to the point of regulation in the alternating current power output and to an exciter field winding magnetically linked to a winding in the rotor of the exciter, producing the alternating current power output, the alternating current power output varying in response to an error signal proportional to a difference between a voltage at the point of reference and a reference voltage which is proportional to a desired voltage at the point of reference.

3. A brushless electrical power generating system in accordance with claim 2 wherein:
   the voltage regulator pulse width modulates the control current as a function of the error signal.

4. A brushless electrical power generating system in accordance with claim 1 wherein:
   the common mode inductor has a pair of windings magnetically coupled together respectively producing magnetic fields in phase opposition and in series with the field winding.

5. A brushless electrical power generating system in accordance with claim 2 wherein:
   the common mode inductor has a pair of windings magnetically coupled together respectively producing magnetic fields in phase opposition and in series with the field winding.

6. A brushless electrical power generating system in accordance with claim 3 wherein:
   the common mode inductor has a pair of windings magnetically coupled together respectively producing magnetic fields in phase opposition and in series with the field winding.

7. A brushless electrical power generating system in accordance with claim 1 further comprising:
   a permanent magnet generator having a permanent magnet rotor rotated when the rotors of the exciter and the main generator are rotated which produces current for exciting a field winding of the exciter.

8. A brushless electrical power generating system in accordance with claim 2 further comprising:
   a permanent magnet generator having a permanent magnet rotor rotated when the rotors of the exciter and the main generator are rotated which produces current for exciting a field winding of the exciter 9. A brushless electrical generating system in accordance with claim 3 further comprising:
   a permanent magnet generator having a permanent magnet rotor rotated when the rotors of the exciter and the main generator are rotated which produces current for exciting a field winding of the exciter 10. A brushless electrical power generating system in accordance with claim 4 further comprising:
    a permanent magnet generator having a permanent magnet rotor rotated when the rotors of the exciter and the main generator are rotated which produces current for exciting a field winding of the exciter 11. A brushless electrical power generating system in accordance with claim 5 further comprising:
    a permanent magnet generator having a permanent magnet rotor rotated when the rotors of the exciter and the main generator are rotated which produces current for exciting a field winding of the exciter.

12. A brushless electrical power generating system in accordance with claim 6 further comprising:
    a permanent magnet generator having a permanent magnet rotor rotated when the rotors of the exciter and the main generator are rotated which produces current for exciting a field winding of the exciter.

13. In a brushless electrical power generating system having a voltage regulator which controls a control current in an exciter field winding for regulating a voltage of alternating current electrical power produced by a main AC generator, the improvement comprising:
    a common mode inductor capacitively coupled to the exciter field winding and coupled to a field winding of the main generator for cancelling common mode noise from the control current produced by capacitive coupling of the exciter field winding to the field winding of the main AC generator.

14. A brushless electrical power generating system in accordance with claim 13 wherein the common mode indicator comprises:
    a pair of windings magnetically linked together respectively producing magnetic fields in phase opposition; and wherein
    the field winding of the main generators is coupled in series with the pair of windings.

15. A brushless electrical power generating system in accordance with claim 13 further comprising:
    a permanent magnet generator having a permanent magnet rotor rotated when rotors of an exciter and the main generator are rotated which produces current for exciting a field winding of the exciter.

16. A brushless power generating system in accordance with claim 14 further comprising:
    a permanent magnet generator having a permanent magnet rotor rotated when rotors of an exciter and the main generator are rotated which produces current for exciting a field winding of the exciter.

17. A brushless electrical power generating system in accordance with claim 16 wherein:
    the voltage regulator pulse width modulates the current flowing in the exciter field winding.

* * * * *